United States Patent [19]

Zimmermann

[11] 4,054,924
[45] Oct. 18, 1977

[54] VARIABLE MESSAGE RECORDER EMPLOYING SINGLE TAPE LOOP HAVING FAST RESET

[75] Inventor: Joseph J. Zimmermann, Elm Grove, Wis.

[73] Assignee: GTE Automatic Electric Laboratories Incorporated, Northlake, Ill.

[21] Appl. No.: 644,221

[22] Filed: Dec. 24, 1975

[51] Int. Cl.² .............. G11B 15/06; G11B 15/44; G11B 15/52
[52] U.S. Cl. ............... 360/71; 179/6 R; 360/73; 360/74; 250/570
[58] Field of Search ............... 360/71, 72-74, 360/90, 62; 179/6 R, 100.1 DR; 226/24, 43, 45; 250/570-571

[56] References Cited

U.S. PATENT DOCUMENTS

| | | | |
|---|---|---|---|
| 3,281,039 | 10/1966 | Foley | 360/90 |
| 3,423,743 | 1/1969 | Silverman | 360/72 |
| 3,566,132 | 2/1971 | Walker | 360/74 |
| 3,573,393 | 4/1971 | Blackie et al. | 360/72 |
| 3,614,453 | 10/1971 | Johnson | 360/74 |
| 3,731,008 | 5/1973 | Meri | 360/74 |
| 3,780,226 | 12/1973 | Jacobson | 179/6 R |
| 3,953,679 | 4/1976 | Buglewicz | 176/6 R |

*Primary Examiner*—Alfred H. Eddleman
*Attorney, Agent, or Firm*—Robert J. Black

[57] ABSTRACT

A recording playback device employing an endless tape loop as the recording media. In response to a tone signal recorded on the tape, a simple mechanism provides a fast forward operation mode to return the recording tape to its beginning.

4 Claims, 4 Drawing Figures

VARIABLE MESSAGE RECORDER EMPLOYING SINGLE TAPE LOOP HAVING FAST RESET

BACKGROUND OF THE INVENTION

1. Field of the Invention

The present invention relates to devices for processing information on tape and more particularly relates to an improved fast reset variable message magnetic recorder player.

2. Description of the Prior Art

In recent years magnetic recording equipment has found a wide usage in a variety of different environments. A number of different arrangements have been used for recording in such equipment. Reels of tapes, combinations of tape reels and magnetic recording discs and the use of so-called cassettes of magnetic recording tape have all been employed with varying degrees of success for this particular purpose. Naturally the use of several different techniques in the same device is possible and feasible but the complexity results in a unit that is less than economically attractive. A very inexpensive and straight approach is to employ a so-called endless loop of magnetic tape as a media, upon which information may be recorded. Such devices naturally are limited by the amount of tape available and physical limitations of the device size preclude extensive length of magnetic tape being employed for this purpose.

A telephone answering and recording apparatus employing an endless loop tape for the purpose of providing an announcement message in accordance with this technique is taught by U.S. Pat. No. 3,780,226 which issued to Sava W. Jacobson on Dec. 18, 1973. In this unit however, the incoming messages are recorded on a tape cassette even though a common drive mechanism is operative to provide the power for both the endless tape and for the cassette.

As noted however in such arrangements, the size of the outgoing messages is determined by the size of the loop and naturally the size is often ineffective to provide sufficient media for recording of incoming messages. In order to hold the unit to convenient size it is necessary to restrict the length of the loop size. U.S. Pat. No. 3,281,039 which issued to Thomas P. Foley on Oct. 25, 1966 suggests an optional arrangement. In this arrangement an improved information processing device employing a magnetic tape loop is suggested wherein the effective usable tape surface is increased substantially without increasing the size of the overall device by employing a tape loop having magnetizable layers on two surfaces along with a twisted configuration of the tape so that two complete revolutions of the tape are required to expose both surfaces to a magnetic read and write head. In this manner, the effective tape surface available for recording and playback is doubled.

No technique however is taught in the Foley patent whereby if the information recorded on the tape occupies less than the entire tape, the tape can be rapidly returned to its beginning. In the Foley arrangement, a complete cycle of the tape must be employed each and every time it is utilized. Obviously a requirement for fast return to the beginning exists.

While the use of simple magnetic tape loops has been widely used, difficulty obviously exists with usage thereof, since it is impossible to rewind such tapes, usually employing instead a fast forward feed. The fast forward feed or mode of operation of the tape is frequently attained by speeding up the rotating speed of a rotary capstan for driving the tape. It is well known that the rotating speed of an electric motor for driving the capstan can be raised or a reduction ratio of a speed reducing device coupling the electric motor to the capstan can be reduced for the purpose of speeding up the rotating speed of the capstan. However a motor capable of varying its rotating speed is generally expensive and a speed reducing device is complicated to automate. Fast reset devices for tape recorders usually involve a great deal of electromechanical apparatus which must be critically adjusted, must rewind or advance at extremely high speeds and usually will not provide a fast enough reset time. For instance, a one minute tape might take three to four seconds which might be too slow for some applications. On the other hand, drum and disc type recorders provide fast reset but also entail extensive cost in the recorder media as well as in the apparatus itself. Accordingly it is the purpose of the present invention to provide a magnetic tape recorder playback device which employs the economic advantages of a single or endless loop of tape as the recording media and provides a simple inexpensive fast reset technique.

SUMMARY OF THE INVENTION

The foregoing objective is achieved by providing apparatus wherein an endless tape loop is employed for recording of messages. To fascilitate the above, a tape drive mechanism is provided for driving the endless tape loop which is positioned in a manner whereby a half twist is made in the tape for joining the two ends together to form the endless loop. Also incorporated in one side of the tape is a light reflective segment, whose purpose will be described hereinafter. Positioned on the same support mechanism on which the drive apparatus is included, is a magnetic pickup head having electrical circuit connections to a conventional playback circuitry and to a tone operated relay.

To provide the necessary control in the present invention, a tone signal is recorded on the tape at the conclusion of any information recorded thereon. In addition a light source is positioned on the same support mechanism as is a light sensitive device such as photodiode. Positioning of these items is on the same support and in such a manner that light reflected from a portion of the endless tape loop causes an electrical output from the photosensitive device. It is this light sensitive device and the associated light source that provide the beginning and end control signals which are employed in control of the present device. The tone signal recorded on the endless tape loop provides the necessary control signal for shifting from a normal operating speed to a fast forward mode of operation.

Assuming the device is manually or automatically placed in operation, the endless tape loop will advance off a position wherein a signal is present at the light sensitive device and will operate to make two complete loops normally after which light will be reflected from the reflective portion of the tape, causing an output from the associated photosensitive device. Operation of this photosensitive device is effective to operate a relay which opens the operating path to the motor when the device is in its beginning or home position. A conventional magnetic pickup head mounted on the device and connected through conventional playback electronics is connected to a relay which in its ON operated position provides an operating path to an electromagnet which maintains a pressure roller in contact against the tape causing it to be driven by a first capstan driven at the normal operating rate of speed.

When the tone is detected by the pickup head the relay operates. In its operated position it disconnects the first electromagnet and operates the second to disengage the first pressure roller and engage a second causing the tape to be driven by a second capstan at a speed substantially higher than the normal playback speed. By adjustment of capstan diameter, flywheel diameter and drive pulleys, a substantial difference in speed is achieved. When the tape returns to its homing position the reflective segment will cause light to fall on the previously mentioned photosensitive device causing operation of the first relay which will terminate operation of the motor. Naturally when the motor is stopped, the tone disappears and the second relay is rendered inoperative causing the second electromagnet to restore and the first to reoperate placing the unit in condition for a second or further reoperation.

DESCRIPTION OF THE PREFERRED EMBODIMENT

Figure 1:
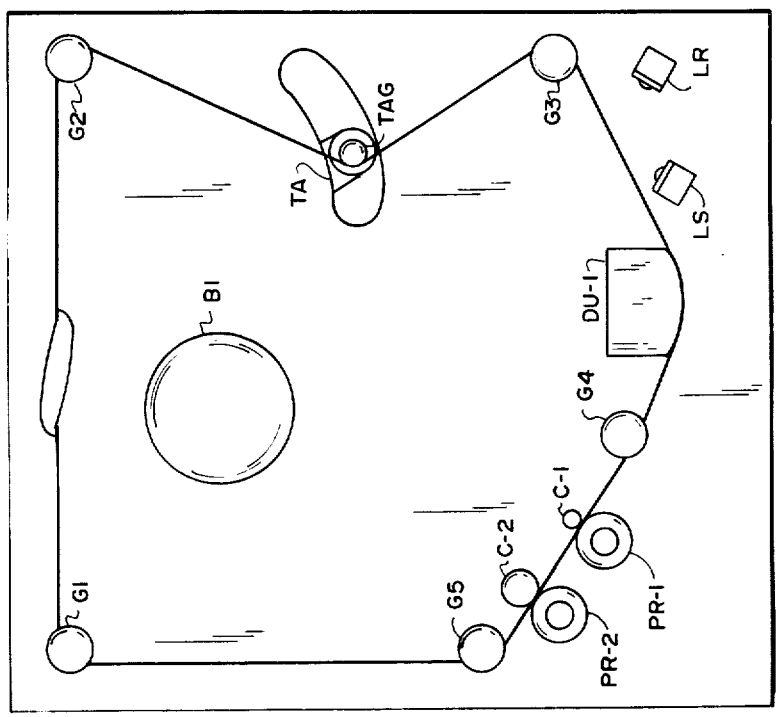
FIG. 1 is a top view of a recording playback apparatus in accordance with the present invention.

An understanding of the present invention will be had by taking into consideration the following description in connection with the drawings. Referring first to FIG. 1, a drive motor B1 is positioned on a suitable mounting plate or base with the drive shaft mounted below the base as may be seen by reference to FIG. 2. Located on the upper surface of the base are guide posts G1, G2, G3, G4 and G5 respectively on which tape TP1 is positioned. As may be noted, TP1 includes a 180° twist or turn as may be noted between guides G1 and G2. A recording playback head PU1 is positioned so that the tape surface of tape TP1 rides across its surface in a conventional manner. Drive for the tape is provided by either capstan C1 or C2 which are kept in contact with the tape by means of pressure rollers PR1 or PR2 respectively which in turn are actuated by electromagnets M1 or M2 respectively which may be seen by referring to FIG. 2. One or the other of these pressure rollers maintain a constant pressure against the tape, placing it in contact with its associated driving capstan, which in turn is rotated from below the base by a pulley combination which may be seen by reference to FIG. 2. A constant pressure is also placed upon the tape TP1 by a guide TAG projecting upward from tension arm TA which is located below the base and projects upward through a slot in the base.

Also included on the base as may be noted in FIG. 1, is a light source mounting LS in which is mounted a light source LS1. Also positioned in such a manner so that a reflective surface on the tape will reflect light from light source LS1 onto its surface, is a photosensitive device LR1 which is mounted in photosensitive device mounting LR.

Figure 2:
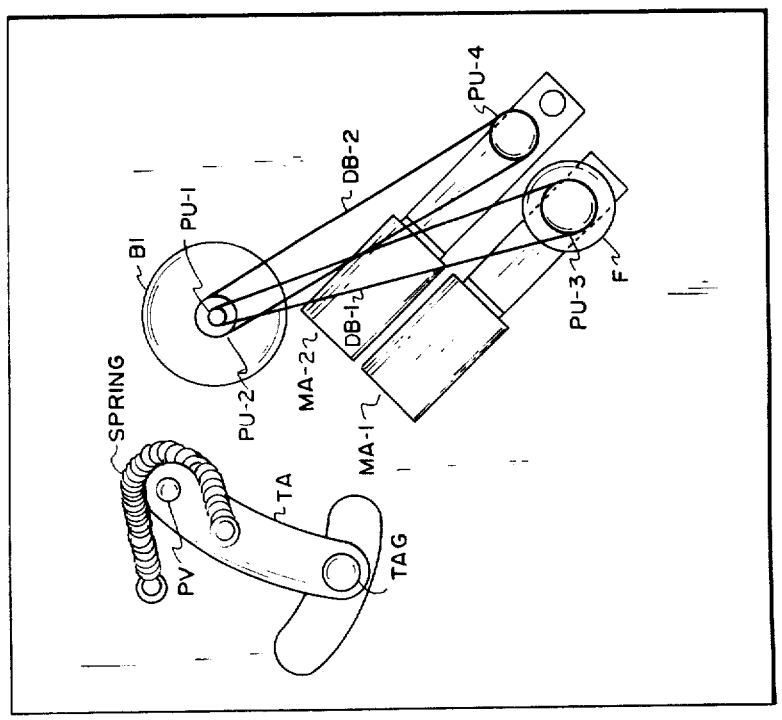
FIG. 2 is a bottom view of a recording playback apparatus in accordance with the present invention.

By reference to FIG. 2, it will be noted that motor B1's drive shaft has mounted thereon two drive pulleys PU1 and PU2 connected by means of drive belts DB1 and DB2 to pulleys PU3 and PU4 respectively which are directly connected to capstans C1 and C2. Pulley PU3 is fastened to the lower end of capstan C1 and pulley PU4 to capstan C2, which project through the base to drive the tape as noted in FIG. 1.

As noted previously, a tension arm guide as seen in FIG. 1 projects through a slot in the base but is connected to the tension arm TA. Tension arm TA is pivoted at point PV and maintained under tension by coil spring S.

From the above it would be obvious that motor B1 drives capstan C1 and C2, and that the combination of either pressure roller PR1 and capstan C1 or pressure roller PR2 and capstan C2 may be employed to advance the tape. The tension arm TA is biased by coil spring S to keep the tape at a constant pressure on the tape head. Also mounted on the bottom of the base are magnets M1 and M2 which are associated with pressure rollers PR1 and PR2 respectively. It is actuation of these magnets that causes the selected pressure roller to be employed to cause drive at the appropriate speed. Pressure roller PR1 actuated by magnet M1 causes the advance of the tape at normal speed while operation of magnet M2 operates pressure roller PR2 to drive the tape at the fast forward speed.

Figure 4:
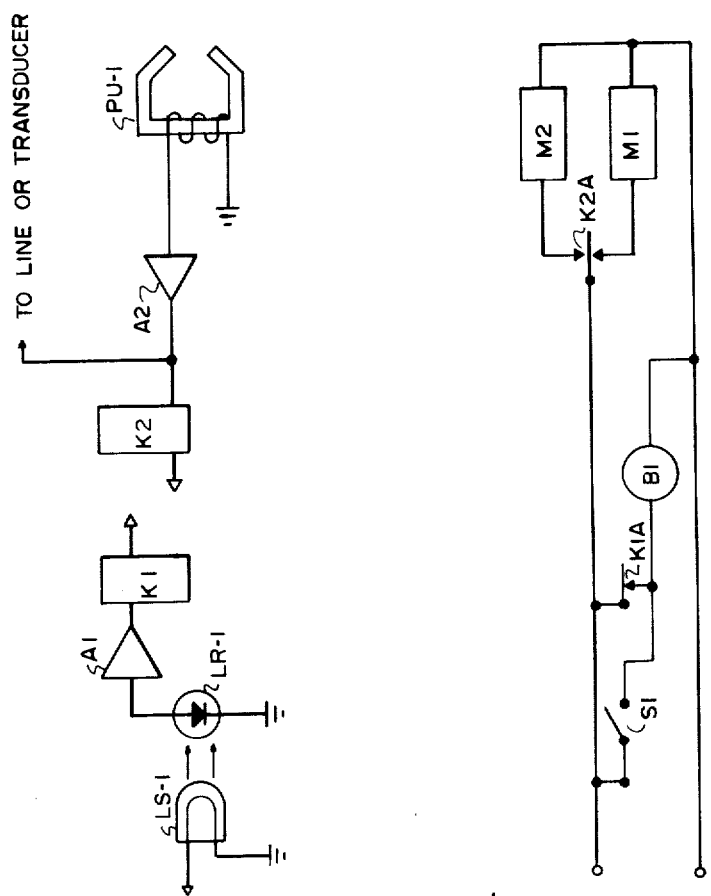
FIG. 4 is a partial schematic diagram of a recording playback apparatus in accordance with the present invention.

As may be noted by referring to the schematic diagram of FIG. 4, light sensitive device LR1 has been shown as a photosensitive diode while the associated light source LS1 has been shown as an incadescent lamp. It would be obvious to those skilled in the art that other forms of light source may be employed as well as other types of photosensitive devices. Referring now to the partial schematic circuit diagram of the present invention shown in FIG. 4, light source LS1, as will be noted, provides light when a reflective surface on the tape is properly located to cause operation of light sensitive diode LR1 whose output will be amplified to provide an operating signal to relay K1. Also shown is relay K2 which operates to break the operating path from magnet M1 and actuates magnet M2 in response to an amplified signal from magnetic pickup PU1.

Figure 3:
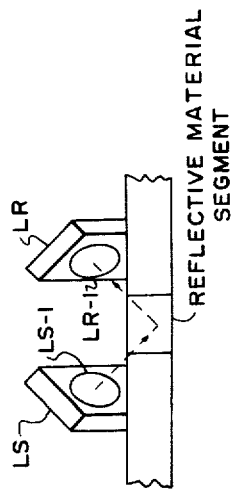
FIG. 3 is a partial side view of a recording playback apparatus in accordance with the present invention showing the manner in which a light source and a light sensitive device may be positioned relative to the tape media in accordance with the teachings of the present invention.

Referring to the above drawings now in combination, a description of the operation of the present invention is as follows:

Assume that tape TP1 is positioned on the device and that its reflective surface located on the tape (as may be seen in reference to FIG. 3), will cause an output at light sensitive device LR1 which will cause operation of relay K1. Since relay K1 is operated at its contacts K1A, the normal operating path from motor B1 is open and the device is at rest. Assume now that switch S1 (which may be operated in any conventional manner) is operated, power will be supplied from a DC power source to motor B1 causing it to operate and advance the tape TP1. As the reflective segment of the tape advances so that light is no longer reflected on light sensitive diode LR1, relay K1 will restore and at contacts K1A an operating path will be maintained for motor B1 even though switch S1 may have been restored. As it will be observed, magnet M1 is also actuated and will cause pressure roller PR1 to engage the tape and force it against capstan C1.

The tape now in response to drive from capstan C1 will make one complete revolution but becuase of the 180° twist occurring in the tape the light reflective surface will now be positioned on the opposite side of the tape and unless other means are provided will continue on to make a second complete revolution returning the reflective segment on the tape again to its homing position wherein light would be reflected from light source LS1 onto light sensitive diode LR1 to cause the reoperation of relay K1 which at its contacts K1A will break the operating power for motor B1.

Assuming however that the entire tape length has not been utilized for recording information, it is desirable to rapidly return the tape to its homing position after completion of the message. To accomplish this a tone signal is prerecorded on the tape at the completion of the information. This tone signal is picked up by magnetic pickup PU1, amplified and utilized to drive tone sensitive relay K2. On operation relay K2 transfers operating potential from magnet M1 to magnet M2. In this manner in a response to the release of the magnet M1, pressure roller PR1 is withdrawn from contact with the tape and pressure roller PR2 is placed in contact with the tape, causing the tape to be advanced by capstan C2 instead of capstan C1.

Because of the different pulley and capstan diameters employed, pressure roller PR2 will advance the tape at a much higher speed than that caused by capstan C1. In one practical embodiment of the present invention the reduction provided in the slow speed ratio by the combination of pulley PU1 the flywheel diameter of flywheel F1 and the capstan diameter of capstan C1 will provide a tape speed of approximately 0.5 inches per second. The speed provided by pulleys PU2 and PU4 and capstan C2 was approximately 30 inches per second. This arrangement gave a ratio of approximately 60 to 1 over the slow speed. In other words a 30 second message after being delivered would take approximately ½ second to reset by fast forwarding the tape to the homing position. Inasmuch as magnets M1 and M2 are both operated from make break contacts K2A of relay K2, the system is electrically interlocked so that both drives cannot operate simultaneously. When magnet M2 is operated, the tape advances at the fast speed until the reflective surface again appears and the motor B1 is rendered inoperative in the manner previously described, returning the system to rest.

In addition to its simplicity the present system has the advantages of long tape life, becuase there is no layer-to-layer friction causing wear of tape such as is present in tape cartridges. The system also incorporates economic advantages since the cost of a simple magnetic tape loop is substantially less than that of cartridges or cassettes.

It will be obvious to those skilled in the art that numerous modifications of the present invention may be made without departing from the spirit and scope of the present invention which shall be limited only by the scope of the claims appended hereto.

What is claimed is:

1. A magnetic recording playback device including, a playback head, tape drive means operable at a plurality of speeds, switching means, a two-sides magnetic recording tape formed of a continuous strip with ends joined and having a 180° twist in the loop when disposed in the assembled configuration on said drive means, a tone signal prerecorded on a portion of said tape loop playback device, a light conditioning segment included on one side of said tape, a light source, light responsive means, and said tape drive means comprising: a drive motor initially operated in response to said switching means; first tape advance means operated in response to said motor to advance said tape at a first speed; control means connected to said playback head operated in response to detection of said tone signal recorded on said tape; said first tape advance means rendered inoperative in response to said operated control means; second tape advance means operated in response to said operated control means to advance said tape at a second speed; and said light responsive means operated in response to positioning of said light conditioning segment of said tape source to terminate operation of said drive motor.

2. A magnetic recording playback device as claimed in claim 1, wherein: said first tape advance means comprise, a capstan positioned adjacent a first side of said tape and driven rotationally by said drive motor, a pressure roller positioned adjacent a second side of said tape and opposite said capstan, and an electromagnet connected to said pressure roller normally operated to force said tape in contact relationship with said capstan, said electromagnet rendered inoperative in response to said operated control means.

3. A magnetic recording playback device as claimed in claim 1, wherein: said second tape advance means comprise a capstan positioned adjacent a first side of said tape and driven rotationally by said drive motor, a pressure roller positioned adjacent a second side of said tape and opposite said capstan, and an electromagnet connected to said pressure roller operated in response to said control means to place said tape in contact relationship with said capstan.

4. A magnetic recording playback device as claimed in claim 1, wherein: said control means comprise a relay operated in response to said prerecorded tone signal on said tape, to operate said second tape advance means and render said first tape advance means inoperative.

* * * * *